(12) United States Patent
Mizukami

(10) Patent No.: US 11,755,091 B2
(45) Date of Patent: Sep. 12, 2023

(54) OPTICAL POWER SUPPLY SYSTEM

(71) Applicant: KYOCERA CORPORATION, Kyoto (JP)

(72) Inventor: Tatsuo Mizukami, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 27 days.

(21) Appl. No.: 17/620,069

(22) PCT Filed: Jun. 18, 2020

(86) PCT No.: PCT/JP2020/023905
§ 371 (c)(1),
(2) Date: Dec. 16, 2021

(87) PCT Pub. No.: WO2021/014841
PCT Pub. Date: Jan. 28, 2021

(65) Prior Publication Data
US 2022/0365581 A1    Nov. 17, 2022

(30) Foreign Application Priority Data

Jul. 22, 2019  (JP) .................................. 2019-134243
Jul. 22, 2019  (JP) .................................. 2019-134244

(51) Int. Cl.
*G06F 1/3206* (2019.01)
(52) U.S. Cl.
CPC ................... *G06F 1/3206* (2013.01)

(58) Field of Classification Search
CPC ...................................................... G06F 1/3206
See application file for complete search history.

(56) References Cited

U.S. PATENT DOCUMENTS

2019/0281725 A1 * 9/2019 Byers ....................... H04Q 1/02

FOREIGN PATENT DOCUMENTS

| JP | 2005198396 A | 7/2005 |
| JP | 2010135989 A | 6/2010 |
| JP | 201933626 A | 2/2019 |

\* cited by examiner

*Primary Examiner* — Gary Collins
(74) *Attorney, Agent, or Firm* — HAUPTMAN HAM, LLP

(57) ABSTRACT

An optical power supply system includes power sourcing equipments, powered devices, a detector and a power supply controller. The power sourcing equipments each output feed light. The powered devices are provided so as to correspond to the power sourcing equipments, and each convert the feed light output from their corresponding power sourcing equipments into electric power. The detector detects an electric power amount required by a power supply target of the powered devices. The power supply controller controls, based on the required electric power amount detected by the detector, output of the feed light from each of the power sourcing equipments.

10 Claims, 11 Drawing Sheets

OPTICAL POWER SUPPLY SYSTEM

RELATED APPLICATIONS

The present application is a National Phase of International Application No. PCT/JP2020/023905 filed Jun. 18, 2020, which claims priority to Japanese Applications Nos. 2019-134243, filed Jul. 22, 2019, and 2019-134244, filed Jul. 22, 2019.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, further improvement of optical power supply efficiency is required. As one way therefor, achievement of efficient power supply is required.

Solution to Problem

An optical power supply system of an aspect of the present disclosure includes:
a plurality of power sourcing equipments each outputting feed light;
a plurality of powered devices provided so as to correspond to the plurality of power sourcing equipments and each converting the feed light output from their corresponding power sourcing equipments into electric power;
a detector that detects an electric power amount required by a power supply target of the powered devices; and
a power supply controller that controls, based on the required electric power amount detected by the detector, output of the feed light from each of the power sourcing equipments.

An optical power supply system of another aspect of the present disclosure includes:
a plurality of power sourcing equipments outputting a plurality of feed beams of feed light having wavelengths different from one another;
a powered device that converts the feed light output from the power sourcing equipments into electric power;
a detector that detects electric power amounts of the electric power into which the powered device has converted the feed beams of the feed light; and
a power supply controller that controls, based on the electric power amounts detected by the detector, output of each of the feed beams from the power sourcing equipments.

DESCRIPTION OF EMBODIMENTS

Hereinafter, embodiments of the present disclosure will be described with reference to the drawings.

(1) Outline of System

First Embodiment

Figure 1:
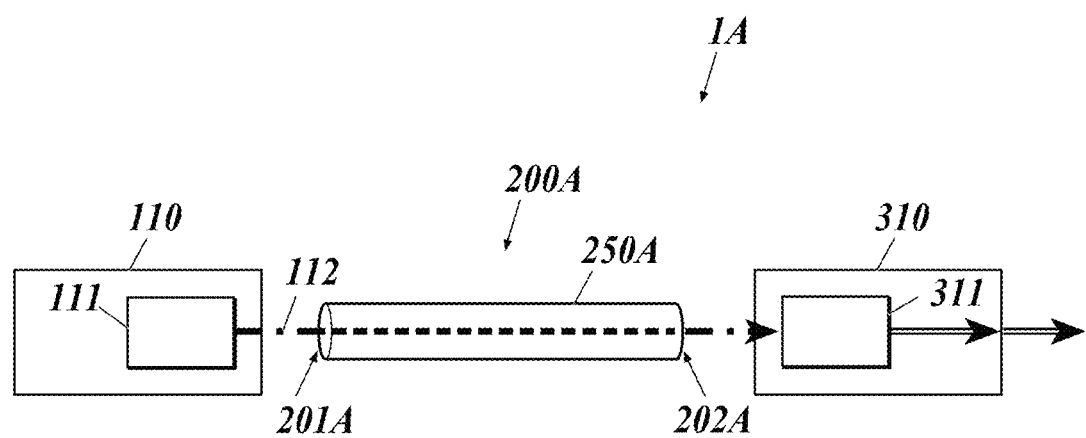
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
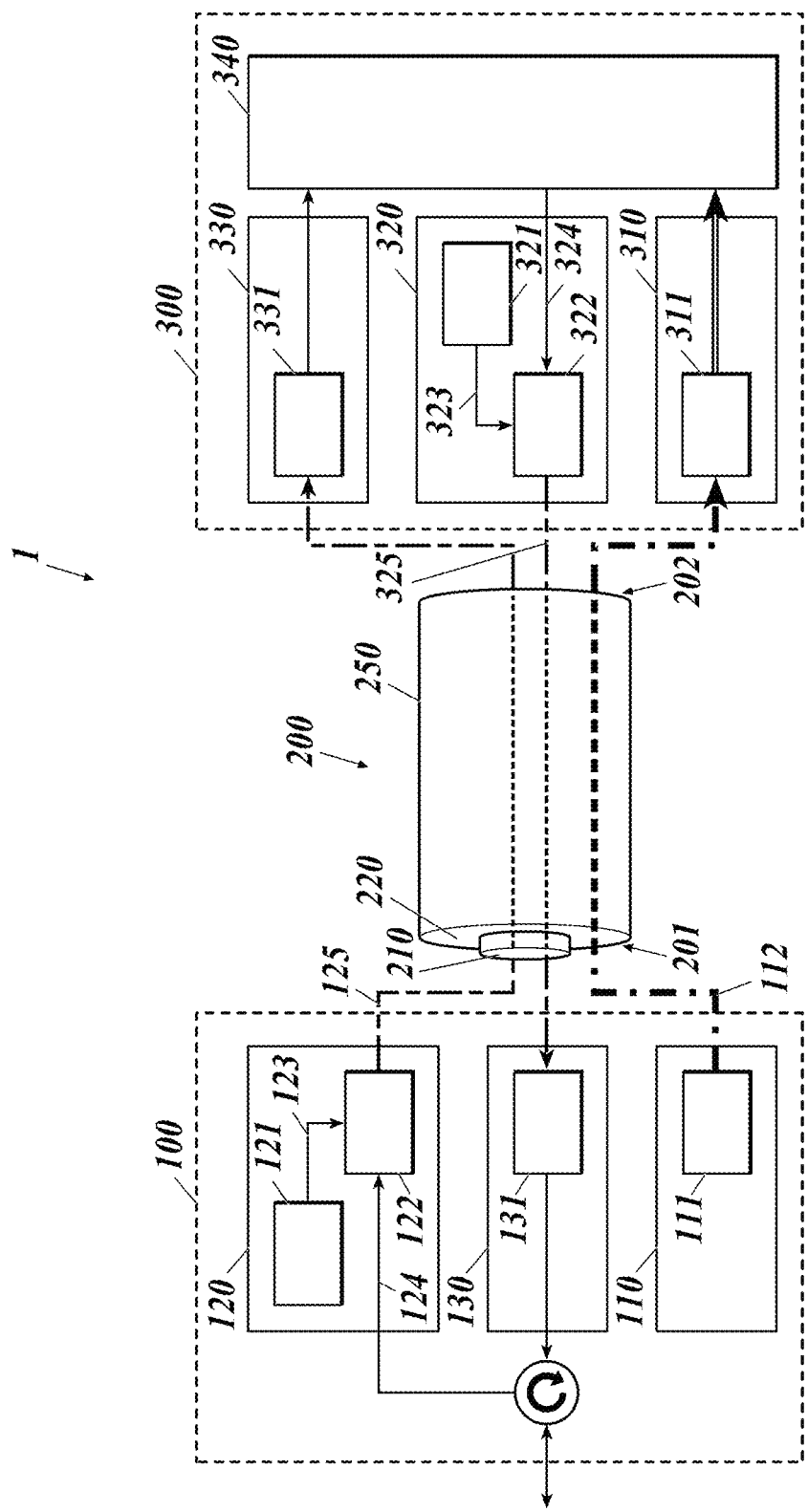
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a power supply network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a power supply network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
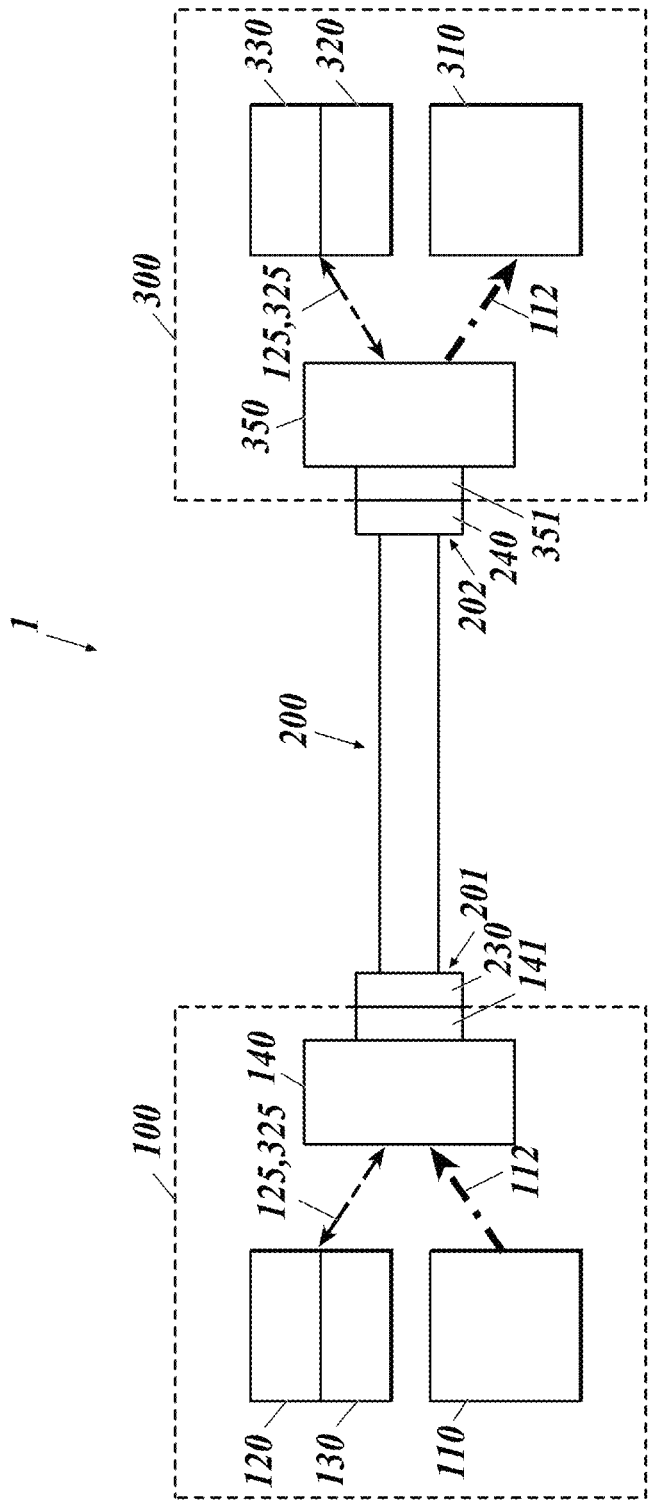
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
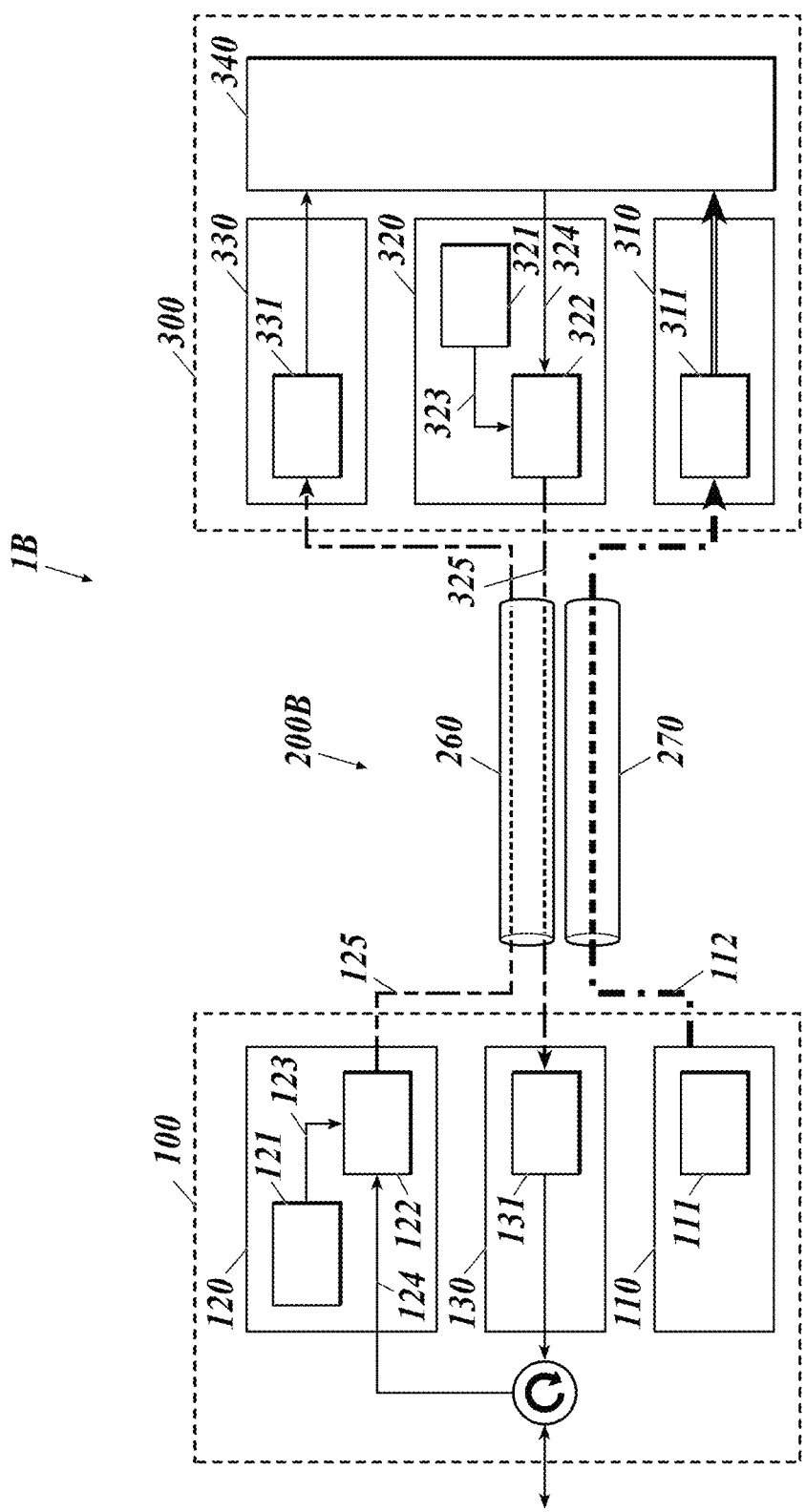
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Power Supply Controller

Next, a power supply controller that controls a power supply amount will be described.

Third Embodiment

Figure 5:
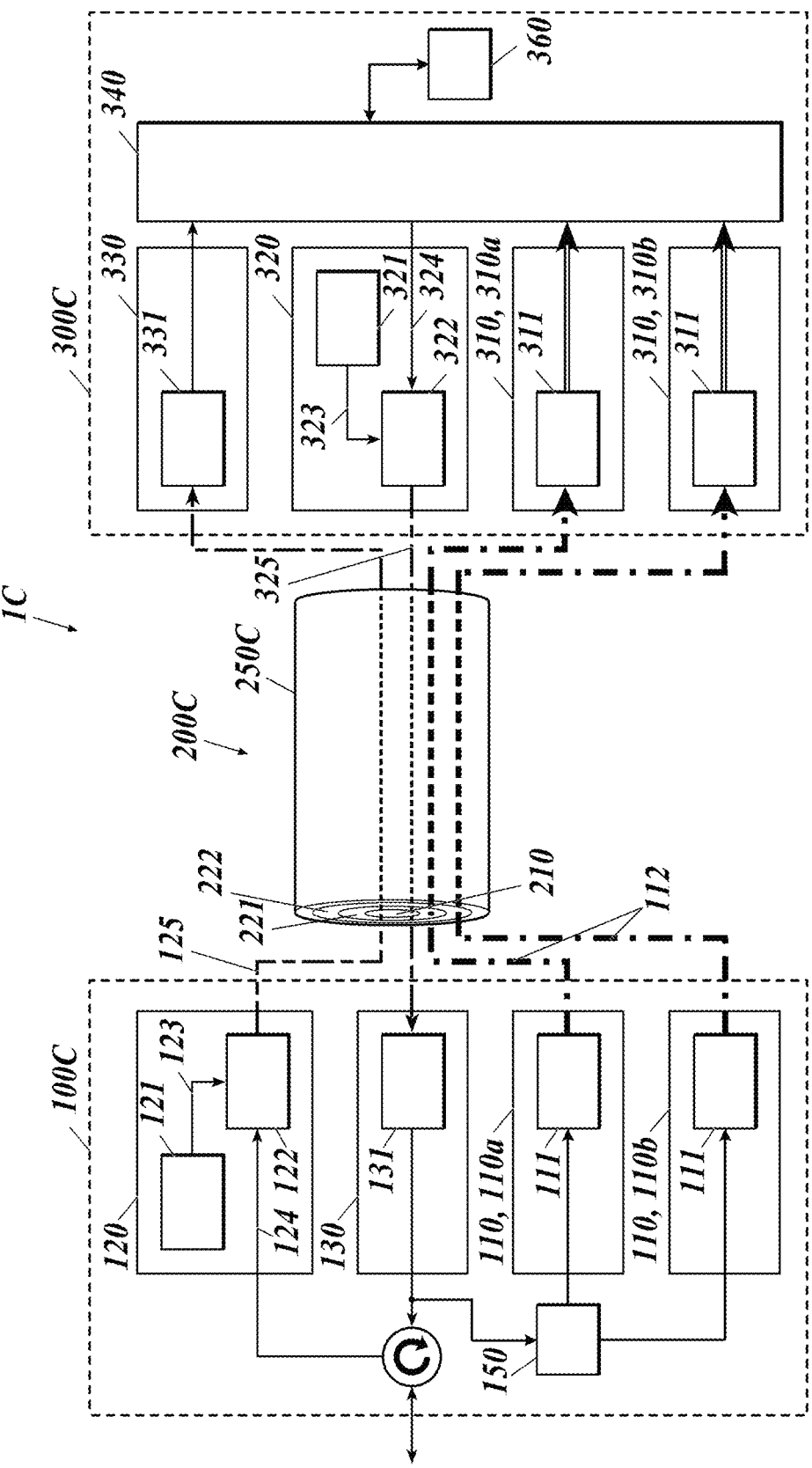
FIG. 5 is a block diagram of a power over fiber system according to a third embodiment of the present disclosure.

FIG. 5 is a block diagram of a power over fiber system according to a third embodiment to which a power supply controller is applied. In FIG. 5, the components same as those described above are denoted by the same reference signs, and detailed descriptions thereof are omitted.

As shown in FIG. 5, a power over fiber system 1C of the third embodiment includes a first data communication device 100C, an optical fiber cable 200C and a second data communication device 300C.

The optical fiber cable 200C includes an optical fiber 250C. The optical fiber 250C includes a core 210, a first cladding 221 around the core 210, and a second cladding 222 around the first cladding 221. The core 210 is a transmission path of the signal light 125/325, and the first cladding 221 and the second cladding 222 are transmission paths of the feed light 112.

As far as the optical fiber 250C is capable of transmitting the signal light 125/325 and the feed light 112 of two power supply systems described below, their transmission paths are not particularly limited. The feed light 112 of the two power supply systems may be transmitted through a single core or cladding.

The second data communication device 300C includes, in addition to the transmitter 320, the receiver 330 and the data processing unit 340, two powered devices 310 (a first powered device 310a and a second powered device 310b) and an electric power detector 360.

The two powered devices 310 each convert the feed light 112 transmitted through the optical fiber cable 200C into electric power with their respective photoelectric conversion elements 311. To the first powered device 310a, the feed light 112 from the first cladding 221 of the optical fiber 250C is input. To the second powered device 310b, the feed light 112 from the second cladding 222 of the optical fiber 250C is input. The electric power obtained by the conversion by the two powered devices 310 is driving power needed in the second data communication device 300, for example, driving power for the transmitter 320, the receiver 330, the data processing unit 340 and the electric power detector 360. The electric power obtained by the conversion by the two powered devices 310 may also be output for an external device(s).

The electric power detector 360 detects an electric power amount needed to drive the second data communication device 300C (including an amount to be output to the outside if any), namely, detects an electric power amount required by a power supply target(s) of the two powered devices 310. The method for detecting the required electric power amount is not particularly limited, and hence may be a method of obtaining information on power consumption from each component of the second data communication device 300C, or may be a method of estimating the required electric power amount by monitoring operation of each component thereof.

The electric power detector 360 transmits information on the obtained required electric power amount (required electric power information) to the data processing unit 340. The data processing unit 340 puts the received required electric power information in the transmission data 324 and outputs the transmission data 324 to the modulator 322 of the transmitter 320. The modulator 322 modulates the laser light 323 on the basis of the transmission data 324, thereby outputting the signal light 325 containing the required electric power information to the first data communication device 100C through the optical fiber cable 200C.

The first data communication device 100C includes, in addition to the transmitter 120 and the receiver 130, two power sourcing equipments 110 (a first power sourcing equipment 110a and a second power sourcing equipment 110b) and a power supply controller 150 as a power supply controller.

The two power sourcing equipments 110 each output the feed light 112 to the optical fiber cable 200C. More specifically, the first power sourcing equipment 110a outputs the feed light 112 to the first cladding 221 of the optical fiber 250C, and the second power sourcing equipment 110b outputs the feed light 112 to the second cladding 222 of the optical fiber 250C. Thus, the two power sourcing equipments 110 correspond to the two powered devices 310 via the optical fiber cable 200C.

That is, the power over fiber system 1C has two power supply systems, which are a first power supply system from the first power sourcing equipment 110a to the first powered device 310a and a second power supply system from the second power sourcing equipment 110b to the second powered device 310b.

The power supply controller 150 obtains the required electric power information of the second data communication device 300C from the signal light 325 output from the photodiode 131 of the receiver 130. Then, the power supply controller 150 controls output of the feed light 112 from each of the two power sourcing equipments 110 (semiconductor lasers 111) on the basis of the obtained required electric power information.

In general, output efficiency of a semiconductor laser for power supply varies according to its output. For example, a semiconductor laser for power supply generates a large amount of heat at the maximum output. Further, transmission efficiency of an optical fiber varies according to the transmission light amount and/or transmission portion. Hence, power supply efficiency of each power supply system varies according to the power supply amount.

To deal with the above, the power supply controller 150 controls output of the feed light 112 from each of the two power sourcing equipments 110 such that the total power supply amount by the two power supply systems satisfies the required electric power amount of the second data communication device 300C and also the net power supply efficiency of the two power supply systems is equal to or greater than a predetermined value. This power supply efficiency includes at least one of the output efficiency of the power sourcing equipments 110 (semiconductor lasers 111) and the transmission efficiency of the optical fiber 250C.

For example, it is possible that correlation data between the output amount and the power supply efficiency of each power supply system is stored in advance, and on the basis of this data, the output is assigned to the two power supply systems such that the net power supply efficiency becomes the maximum. Alternatively, it is possible that a preferred output range in which the power supply efficiency of each power supply system is equal to or greater than a predetermined value is set in advance, and the output is assigned to the two power supply systems such that each of the two power supply systems is used within this output range. Still alternatively, it is possible that the two power sourcing equipments 110 (two power supply systems) are prioritized for use in advance, and the power sourcing equipments 110 successively output the feed light 112 in descending order of the priority according to the required electric power amount. That is, for example, it is possible that in a normal state, the first power supply system is used preferentially, and when the required electric power amount of the second data communication device 300C exceeds the upper limit of the power supply amount of the first power supply system, the second power supply system is used.

Thus, the output from each of the two power sourcing equipments 110 is adjusted according to the required electric power amount of the second data communication device 300C at the power receiving side such that the net power supply efficiency is within a preferred range. In a conventional power supply system, a power sourcing equipment supplies certain (maximum) electric power regardless of electric power load at the power receiving side, and consequently excess electric power is wastefully consumed when the electric power load at the power receiving side is low. In this regard, in the power over fiber system 1C of this embodiment, the output from each of the two power sourcing equipments 110 is adjusted as appropriate according to the required electric power amount at the power receiving side. Hence, unlike the conventional one, efficient power supply according to the electric power load at the power receiving side can be achieved.

Figure 6:
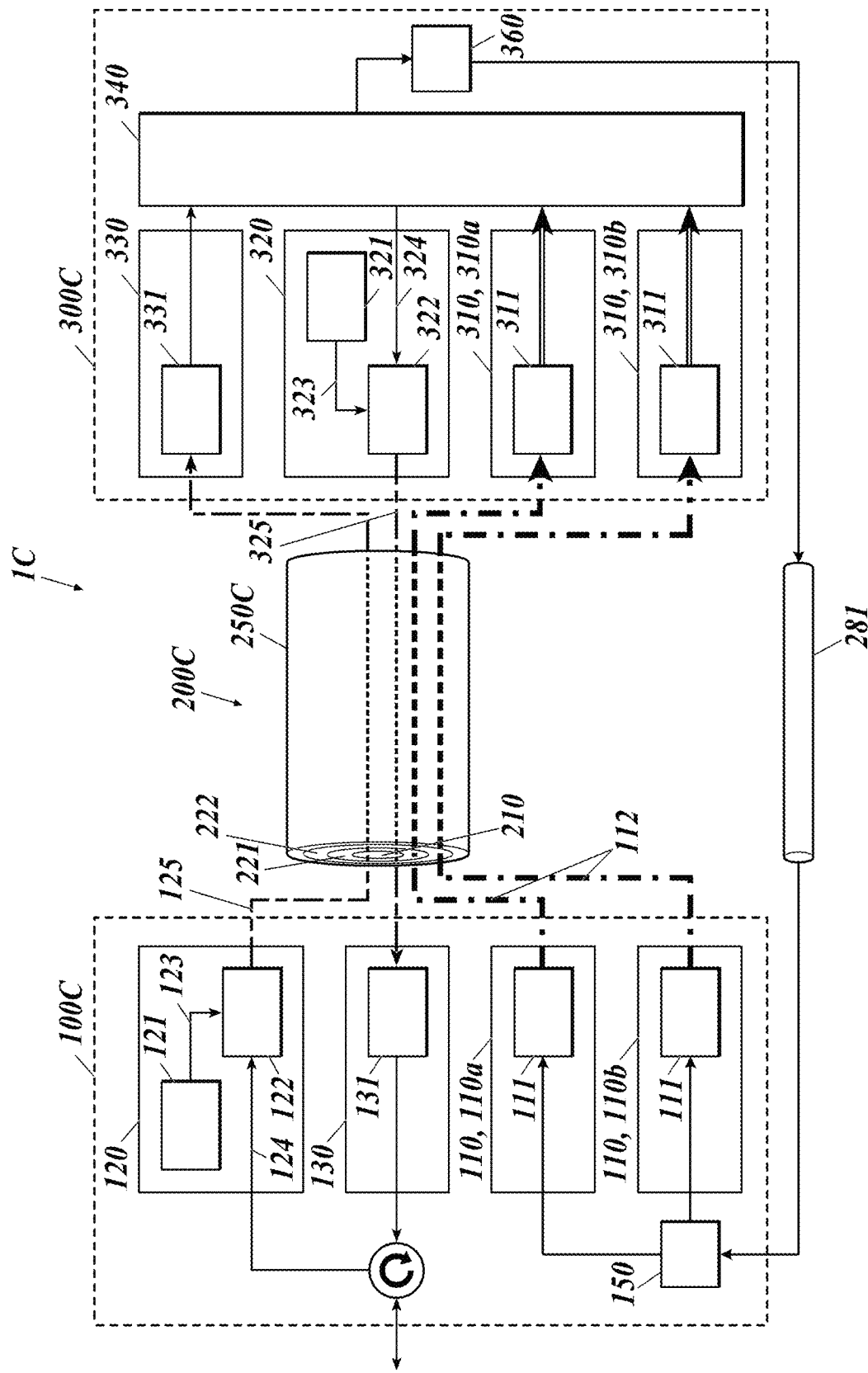
FIG. 6 is a block diagram of a modification of the power over fiber system according to the third embodiment of the present disclosure.

In the power over fiber system 1C of the third embodiment, the required electric power information may be transmitted from the electric power detector 360 of the second data communication device 300C to the power supply controller 150 of the first data communication device 100C through a transmission path 281 that is different from the optical fiber cable 200C, as shown in FIG. 6. In this case, the electric power detector 360 may be an external device independent of the second data communication device 300C.

Further, like the power over fiber system shown in FIG. 4, the power over fiber system 1C of the third embodiment may have an optical fiber that transmits signal light and an optical fiber that transmits feed light separately.

Fourth Embodiment

Figure 7:
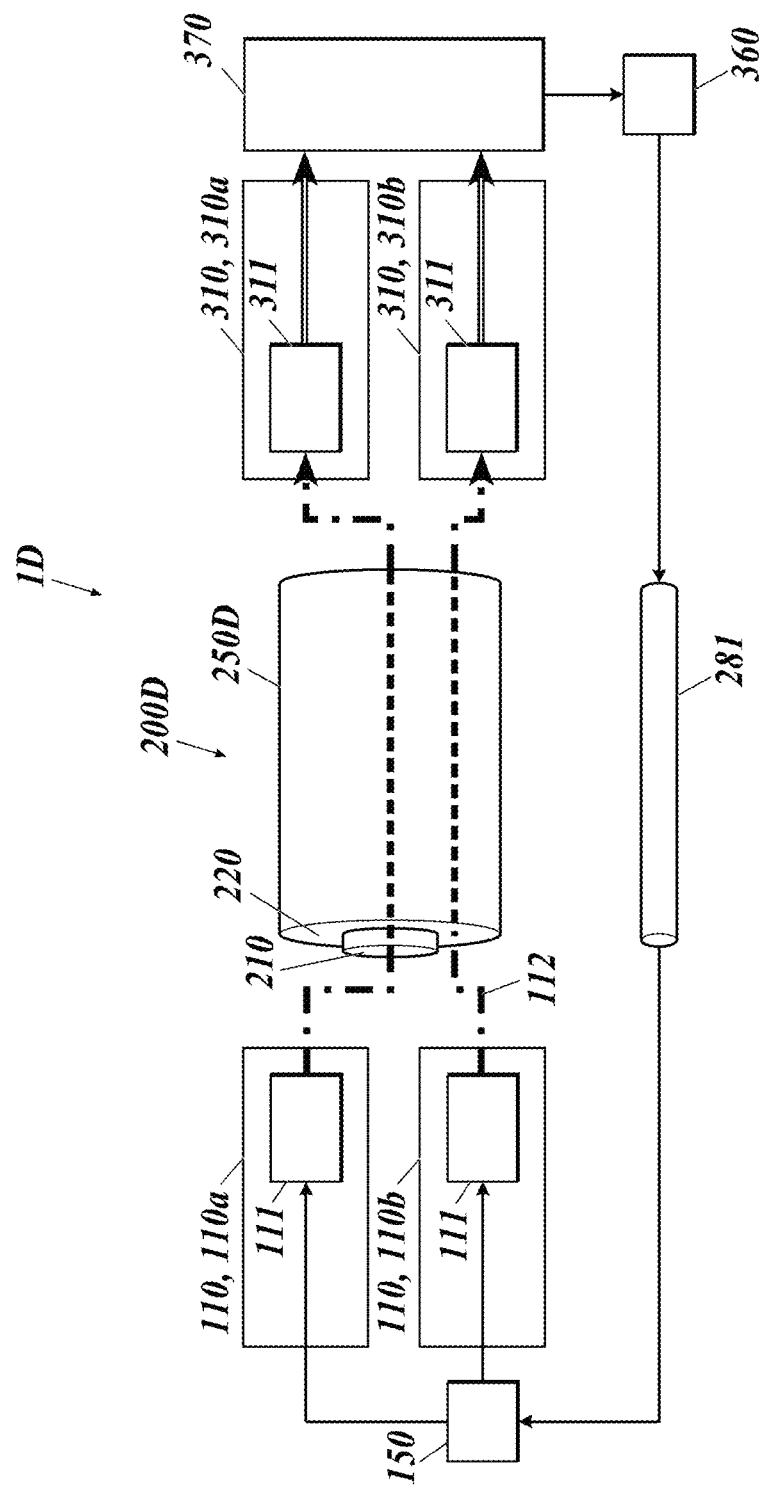
FIG. 7 is a block diagram of a power over fiber system according to a fourth embodiment of the present disclosure.

FIG. 7 is a block diagram of a power over fiber system according to a fourth embodiment to which a power supply controller is applied. In FIG. 7, the components same as those described above are denoted by the same reference signs, and detailed descriptions thereof are omitted.

As shown in FIG. 7, a power over fiber system 1D of the fourth embodiment is different from the power over fiber system 1C of the third embodiment, mainly in that no communication system is provided. However, the power over fiber system 1D may have a not-shown communication system independent of its power supply systems.

The power over fiber system 1D includes two power sourcing equipments 110, an optical fiber cable 200D and two powered devices 310.

The optical fiber cable 200D includes an optical fiber 250D. The optical fiber 250D includes a core 210 and a cladding 220 around the core 210. The core 210 and the cladding 220 are transmission paths of the feed light 112. As far as the optical fiber 250D is capable of transmitting the feed light 112 of two power supply systems, their transmission paths are not particularly limited. The feed light 112 of the two power supply systems may be transmitted through a single core or cladding.

The two power sourcing equipments 110 and the two powered devices 310 correspond to one another and constitute the two power supply systems. In a first power supply system, the feed light 112 from a first power sourcing equipment 110a is supplied to a first powered device 310a through the core 210 of the optical fiber 250D. In a second power supply system, the feed light 112 from a second power sourcing equipment 110b is supplied to a second powered device 310b through the cladding 220 of the optical fiber 250D.

Electric power into which the two powered devices 310 have converted the feed light 112 is supplied to a power supply target 370. An electric power amount required by the power supply target 370 is detected by an electric power detector 360. The electric power detector 360 transmits information on the required electric power amount to a power supply controller 150 at the power supplying side through a transmission path 281.

The power supply controller 150 controls output of the feed light 112 from each of the two power sourcing equipments 110 (semiconductor lasers 111) on the basis of the received required electric power information.

Thus, as in the third embodiment, the output from each of the two power sourcing equipments 110 is adjusted according to the required electric power amount of the second data communication device 300C at the power receiving side such that the net power supply efficiency is within a preferred range. Hence, unlike a conventional one in which a power sourcing equipment supplies certain (maximum) electric power regardless of electric power load at a powered device, efficient power supply according to the electric power load at the power receiving side can be achieved.

Fifth Embodiment

Figure 8:
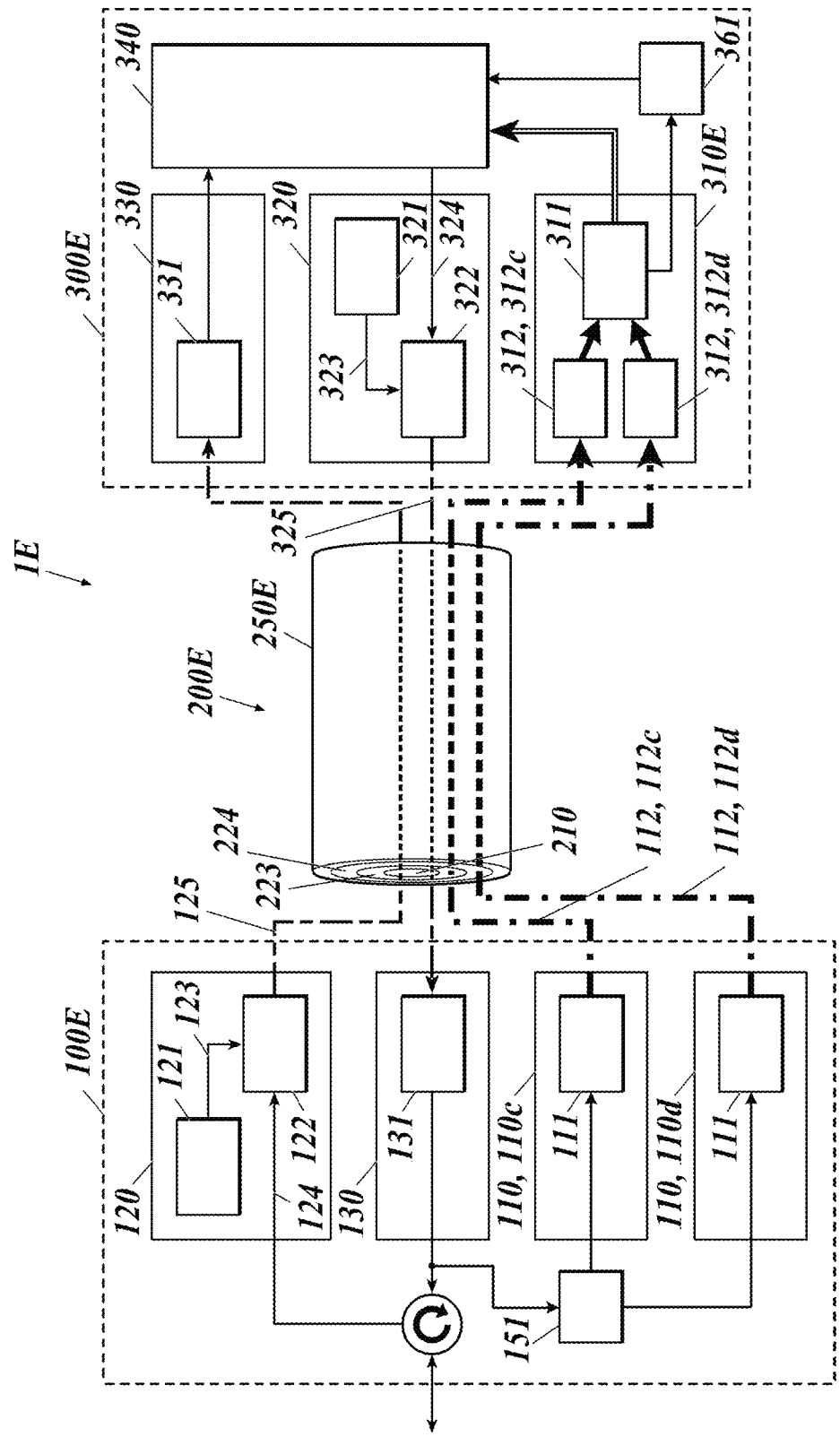
FIG. 8 is a block diagram of a power over fiber system according to a fifth embodiment of the present disclosure.

FIG. 8 is a block diagram of a power over fiber system according to a fifth embodiment to which a power supply controller is applied. In FIG. 8, the components same as those described above are denoted by the same reference signs, and detailed descriptions thereof are omitted.

As shown in FIG. 8, a power over fiber system 1E of the fifth embodiment includes a first data communication device 100E, an optical fiber cable 200E and a second data communication device 300E.

The optical fiber cable 200E includes an optical fiber 250E. The optical fiber 250E includes a core 210, a first cladding 223 around the core 210, and a second cladding 224 around the first cladding 223. The core 210 is a transmission path of the signal light 125/325, and the first cladding 223 and the second cladding 224 are transmission paths of the feed light 112.

As far as the optical fiber 250E is capable of transmitting the signal light 125/325 and two types of the feed light 112 described below, their transmission paths are not particularly limited.

The first data communication device 100C includes, in addition to the transmitter 120 and the receiver 130, two power sourcing equipments 110 (a first power sourcing equipment 110c and a second power sourcing equipment 110d) and a power supply controller 151 as a power supply controller.

The two power sourcing equipments 110 output two types of the feed light 112 having wavelengths different from one another. In this embodiment, the semiconductor laser 111 of the first power sourcing equipment 110c outputs short-wavelength feed beam 112c having a shorter wavelength (e.g., 500 nm or less), and the semiconductor laser 111 of the second power sourcing equipment 110d outputs long-wavelength feed beam 112d having a wavelength longer than the short-wavelength feed beam 112c. These two types of the feed light 112 are output to the optical fiber cable 200E. More specifically, the short-wavelength feed beam 112c is output to the first cladding 223 of the optical fiber 250E, and the long-wavelength feed beam 112d is output to the second cladding 224 of the optical fiber 250E.

The power supply controller 151 obtains electric power amount information, which is described below, from the second data communication device 300E, and controls output of each of the feed beams 112 from the two (respective) power sourcing equipments 110 (semiconductor lasers 111) on the basis of the electric power amount information. The specific control method is described below.

The second data communication device 300E includes, in addition to the transmitter 320, the receiver 330 and the data processing unit 340, a powered device 310E and an electric power detector 361.

The powered device 310E includes two wavelength converters 312 (a first wavelength converter 312c and a second wavelength converter 312d) and a photoelectric conversion element 311.

The two wavelength converters 312 are provided for the two types of the feed light 112. The two wavelength converters 312 convert the wavelengths of the two types of the feed light 112 transmitted through the optical fiber cable 200E into wavelengths capable of being photoelectrically converted by the photoelectric conversion element 311. The first wavelength converter 312c receives input of the short-wavelength feed beam 112c from the first cladding 223 of the optical fiber 250E, and converts the wavelength of the short-wavelength feed beam 112c, and the second wavelength converter 312d receives input of the long-wavelength feed beam 112d from the second cladding 224 of the optical fiber 250E, and converts the wavelength of the long-wavelength feed beam 112d.

The photoelectric conversion element 311 converts the feed light 112 wavelength-converted by the two wavelength converters 312 into electric power. At the time, to the photoelectric conversion element 311, only the feed beam 112 from one of the two wavelength converters 312 is input. The electric power obtained by the conversion by the photoelectric conversion element 311 is driving power needed in the second data communication device 300E, for example, driving power for the transmitter 320, the receiver 330, the data processing unit 340 and the electric power detector 361. The electric power may also be output for an external device(s).

The electric power detector 361 detects an electric power amount(s) of electric power obtained by conversion that is performed by the powered device 310E (photoelectric conversion element 311).

The electric power detector 361 transmits information on the detected electric power amount(s) (electric power amount information) to the data processing unit 340. The data processing unit 340 puts the received electric power amount information in the transmission data 324 and outputs the transmission data 324 to the modulator 322 of the transmitter 320. The modulator 322 modulates the laser light 323 on the basis of the transmission data 324, thereby outputting the signal light 325 containing the required electric power information to the first data communication device 100E through the optical fiber cable 200E. The signal light 325 transmitted to the first data communication device 100E is demodulated into an electric signal by the photodiode 131 of the receiver 130. The electric power amount information therein is output to the power supply controller 151.

In the power over fiber system 1E of the fifth embodiment, of the two types of the feed light 112 having wavelengths different from one another, one having a higher power supply efficiency is selected, and power is supplied with this selected type of the feed light 112.

As described above, laser light having a longer wavelength tends to have a higher transmission efficiency, whereas laser light having a shorter wavelength tends to have a higher photoelectric conversion efficiency. Hence, when laser light is transmitted for a long distance, using laser light having a longer wavelength may make the overall power supply efficiency high. Hence, in this embodiment, the power supply efficiency of each of the two types of the feed light 112 having different wavelengths is actually evaluated, and one having a higher power supply efficiency is adopted.

More specifically, the power supply controller 151 of the first data communication device 100E causes the two power sourcing equipments 110 to sequentially output, with the same predetermined electric power, the two types of the feed light 112 having different wavelengths. Each type of the feed light 112 is converted into electric power by the powered device 310E of the second data communication device 300E, and the electric power amount thereof is detected by the electric power detector 361. The electric power detector 361 transmits the electric power amounts obtained from the two types of the feed light 112 to the power supply controller 151. On the basis of information on the electric power amounts (electric power amount information) received from the electric power detector 361, the power supply controller 151 adopts one of the two types of the feed light 112, the one from which a larger electric power amount has been obtained, as the one having a higher power supply efficiency. Then, only the power sourcing equipment 110 that outputs this adopted type of the feed light 112 supplies power to the second data communication device 300E. This electric power evaluation process is performed, for example, at the time of start-up of the system or at the time of change of the transmission length from the first data communication device 100E to the second data communication device 300E.

Thus, power is supplied, of the two types of the feed light 112 having wavelengths different from one another, with one type of the feed light 112 having a higher power supply efficiency. Hence, efficient power supply according to the transmission length can be achieved.

Figure 9:
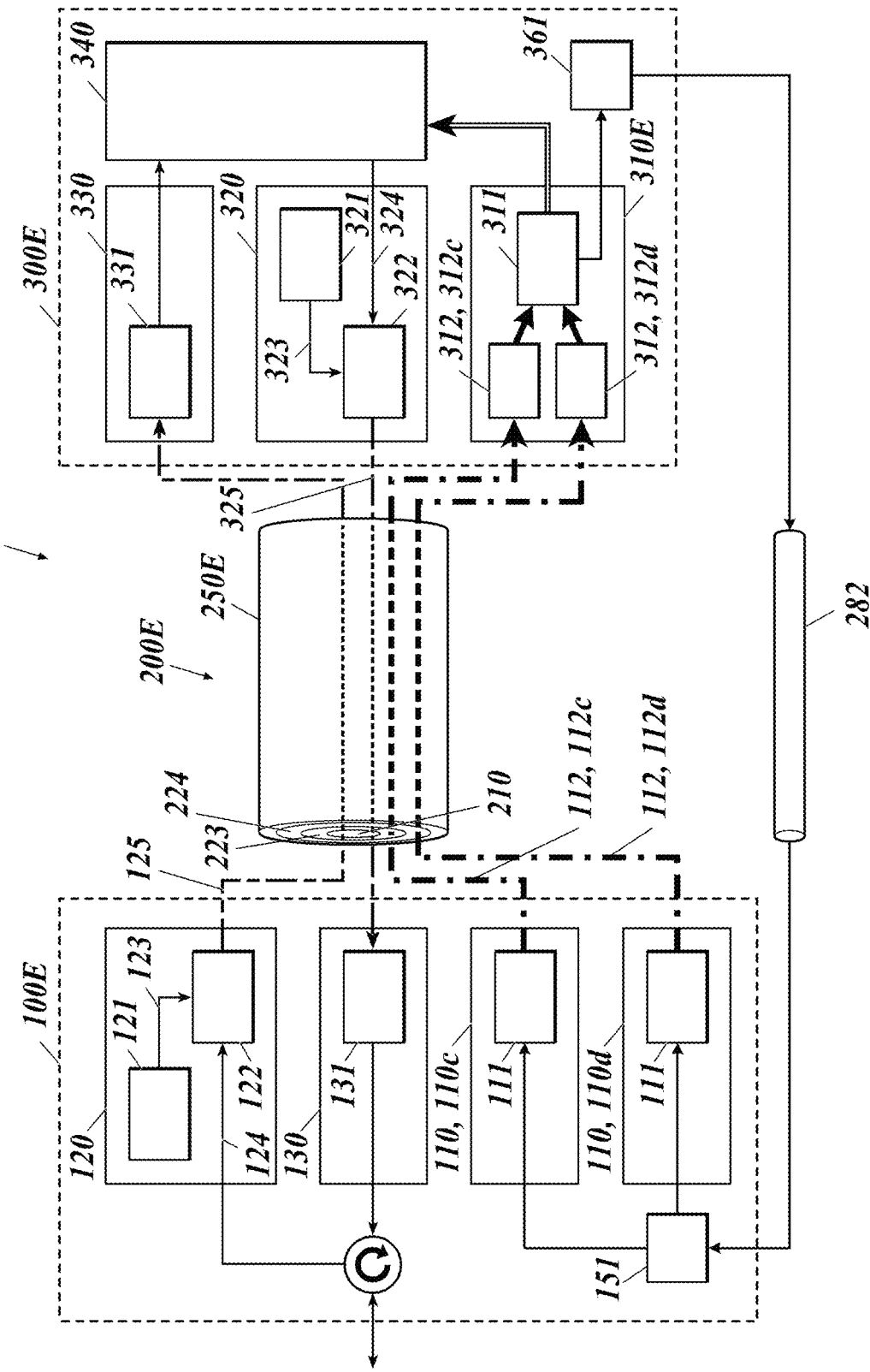
FIG. 9 is a block diagram of a modification of the power over fiber system according to the fifth embodiment of the present disclosure.

In the power over fiber system 1E of the fifth embodiment, the electric power amount information may be transmitted from the electric power detector 361 of the second data communication device 300E to the power supply controller 151 of the first data communication device 100E through a transmission path 282 that is different from the optical fiber cable 200E, as shown in FIG. 9. In this case, the electric power detector 361 may be an external device independent of the second data communication device 300E.

Further, like the power over fiber system shown in FIG. 4, the power over fiber system 1E of the fifth embodiment may have an optical fiber that transmits signal light and an optical fiber that transmits feed light separately.

Sixth Embodiment

Figure 10:
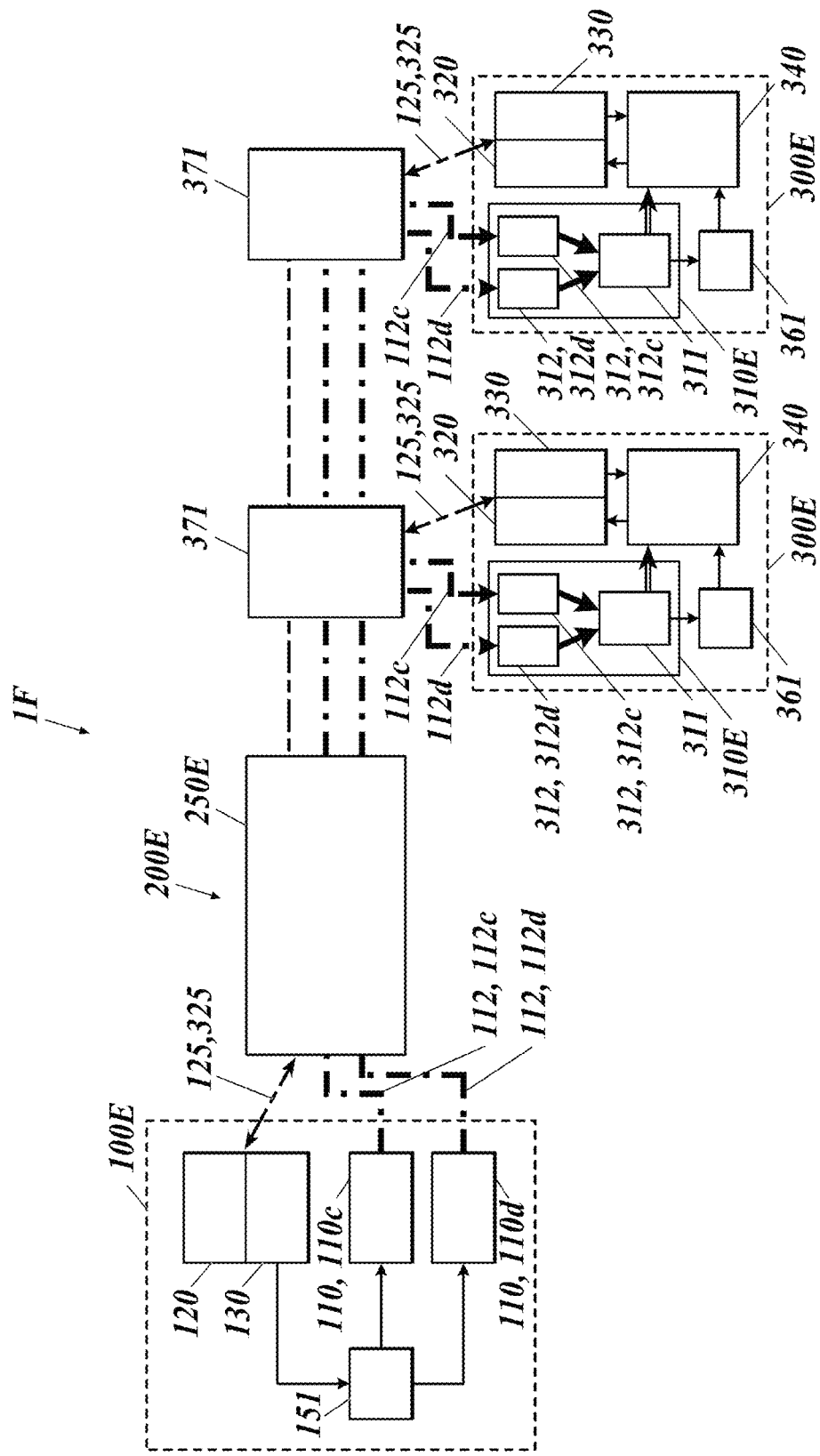
FIG. 10 is a block diagram of a power over fiber system according to a sixth embodiment of the present disclosure.

FIG. 10 is a block diagram of a power over fiber system according to a sixth embodiment to which a power supply controller is applied. In FIG. 10, the components same as those described above are denoted by the same reference signs, and detailed descriptions thereof are omitted.

As shown in FIG. 10, a power over fiber system 1F of the sixth embodiment is different from the power over fiber system 1E of the fifth embodiment, mainly in that two powered devices different in transmission length are provided at the power receiving side.

The power over fiber system 1F includes, in addition to the first data communication device 100E and the optical fiber cable 200E, two second data communication devices 300E at the power receiving side of the optical fiber cable 200E.

The two second data communication devices 300E are connected to the optical fiber cable 200E via their corresponding optical splitters 371 (optical branching devices) connected in series with the optical fiber cable 200E. To (and from) each optical splitter 371, another optical splitter 371 and a second data communication device 300E are connectable (and disconnectable). Each optical splitter 371 splits, at a certain ratio, each of the signal light and the two types of the feed light 112 transmitted from the first data communication device 100E through the optical fiber cable 200E, for another optical splitter 371 and a second data communication device 300E connected thereto. More specifically, each optical splitter 371 can select one of split, optical-path change and through output, for each of the signal light and the two types of the feed light 112.

In the power over fiber system 1F of the sixth embodiment, for each of the two second data communication devices 300E (powered devices 310E) at the power receiving side, the power supply efficiency of each of the two types of the feed light 112 having different wavelengths is evaluated, and one having a higher power supply efficiency is adopted, in the same manner as in the fifth embodiment. That is, for each of the two second data communication devices 300E, the power supply controller 151 controls output of each of the feed beams 112 from the two power sourcing equipments 110 on the basis of the detected electric power amounts, and in each of the two second data communication devices 300E, of the two types of the feed light 112 having wavelengths different from one another, one having a higher power supply efficiency is selected, and power is supplied with this selected type of the feed light 112.

Thus, to each of the two second data communication devices 300E (powered devices 310E) different in transmission length, power is supplied, of the two types of the feed light 112 having wavelengths different from one another, with one type of the feed light 112 having a higher power supply efficiency. Hence, efficient power supply to the two powered devices 310E according to their respective transmission lengths can be achieved.

In the power over fiber system 1F of the sixth embodiment, the electric power amount information may be transmitted from each of the electric power detectors 361 of the second data communication devices 300E to the power supply controller 151 of the first data communication device 100E through a transmission path 282 that is different from the optical fiber cable 200E, as in the power over fiber system shown in FIG. 9. In this case, the electric power detectors 361 may be external devices independent of the second data communication devices 300E.

Further, like the power over fiber system shown in FIG. 4, the power over fiber system 1F of the sixth embodiment may have an optical fiber that transmits signal light and an optical fiber that transmits feed light separately.

Further, as far as a plurality of second data communication devices 300E (powered devices 310E) different in transmission length is provided at the power receiving side of the optical fiber cable 200E, how to connect these second data communication devices 300E is not particularly limited. For example, a single optical splitter 371 may be capable of directly distributing the signal light and the feed light to the plurality of second data communication devices 300E by splitting each of the signal light and the feed light. Alternatively, an optical branching device(s) other than an optical splitter(s) may split each of the signal light and the feed light, for example.

Seventh Embodiment

Figure 11:
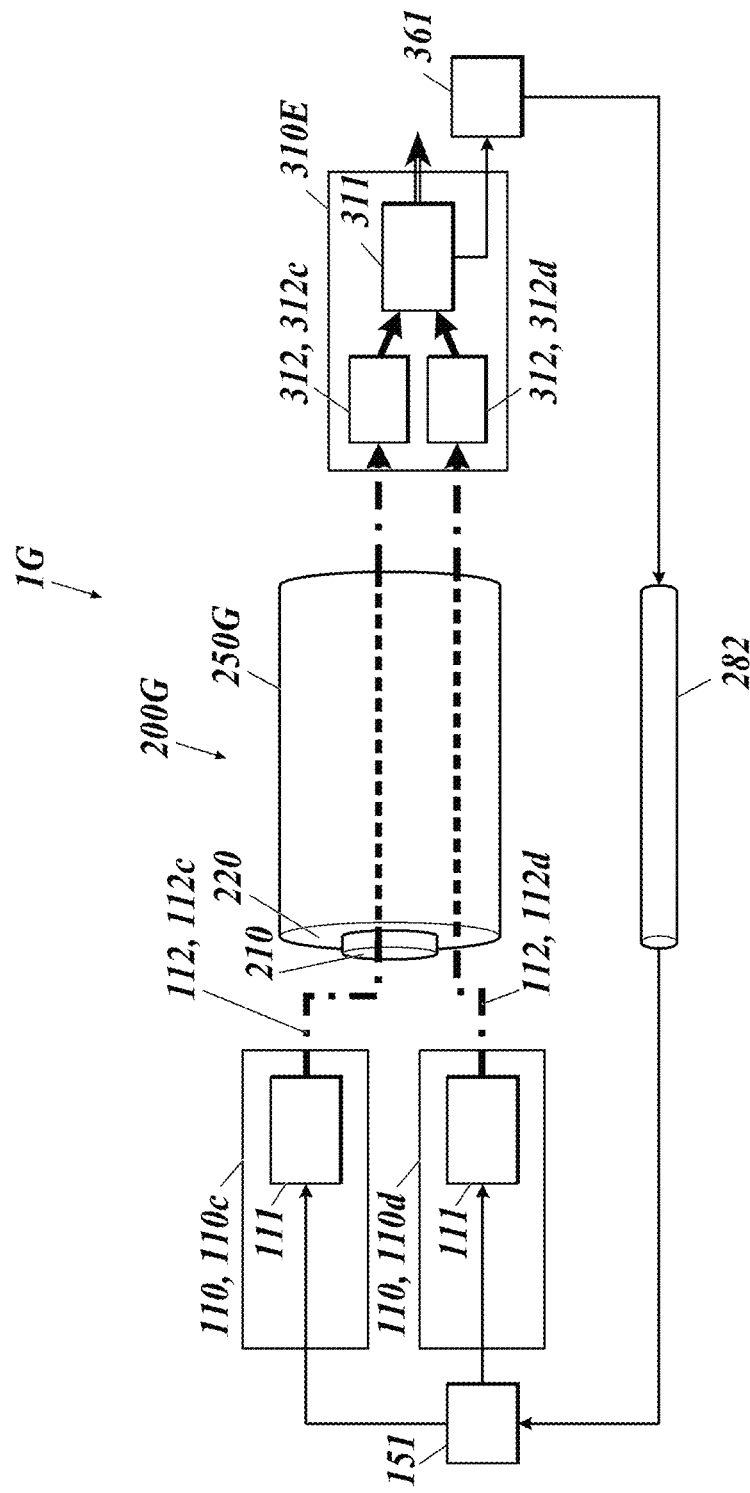
FIG. 11 is a block diagram of a power over fiber system according to a seventh embodiment of the present disclosure.

FIG. 11 is a block diagram of a power over fiber system according to a seventh embodiment to which a power supply controller is applied. In FIG. 11, the components same as those described above are denoted by the same reference signs, and detailed descriptions thereof are omitted.

As shown in FIG. 11, a power over fiber system 1G of the seventh embodiment is different from the power over fiber system 1E of the fifth embodiment, mainly in that no communication system is provided. However, the power over fiber system 1G may have a not-shown communication system independent of its power supply systems.

The power over fiber system 1G includes two power sourcing equipments 110 (a first power sourcing equipment 110c and a second power sourcing equipment 110d), an optical fiber cable 200G and a powered device 310E.

The optical fiber cable 200G includes an optical fiber 250G. The optical fiber 250G includes a core 210 and a cladding 220 around the core 210. The core 210 and the cladding 220 are transmission paths of the feed light 112. As far as the optical fiber 250G is capable of transmitting two types of the feed light 112 (short-wavelength feed beam 112c and long-wavelength feed beam 112d), their transmission paths are not particularly limited.

The two power sourcing equipments 110 output two types of the feed light 112 having wavelengths different from one another (short-wavelength feed beam 112c and long-wavelength feed beam 112d). These two types of the feed light 112 are output to the optical fiber cable 200G. More specifically, the short-wavelength feed beam 112c is output to the core 210 of the optical fiber 250G, and the long-wavelength feed beam 112d is output to the cladding 220 of the optical fiber 250G.

The powered device 310E includes two wavelength converters 312 (a first wavelength converter 312c and a second wavelength converter 312d) and a photoelectric conversion element 311. The two wavelength converters 312 convert the wavelengths of the two types of the feed light 112 transmitted through the optical fiber cable 200G into wavelengths capable of being photoelectrically converted by the photoelectric conversion element 311. The photoelectric conversion element 311 converts the feed light 112 wavelength-converted by the two wavelength converters 312 into electric power. At the time, to the photoelectric conversion element 311, only the feed beam 112 from one of the two wavelength converters 312 is input.

The electric power detector 361 detects an electric power amount(s) of electric power obtained by conversion that is performed by the powered device 310E (photoelectric conversion element 311). The electric power detector 361 transmits information on the detected electric power amount(s) (electric power amount information) to the power supply controller 151 through a transmission path 282.

The power supply controller 151 controls output of each of the feed beams 112 from the two power sourcing equipments 110 (semiconductor lasers 111) on the basis of information on the electric power amounts (electric power amount information) received from the electric power detector 361. More specifically, in the same manner as in the fifth embodiment, the power supply controller 151 selects, of the two types of the feed light 112 having wavelengths different from one another, one having a higher power supply efficiency, and power is supplied with this selected type of the feed light 112.

Thus, as in the fifth embodiment, power is supplied, of the two types of the feed light 112 having wavelengths different from one another, with one type of the feed light 112 having a higher power supply efficiency. Hence, efficient power supply according to the transmission length can be achieved.

The power over fiber system 1G of the seventh embodiment may be configured, like the power over fiber system shown in FIG. 10, to supply power to a plurality of powered devices 310E. In this case, each of the (two) second data communication devices 300E shown in FIG. 10 may be replaced by the powered device 310E.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

For example, in the third and fourth embodiments, the power over fiber system includes two power supply systems (i.e., two power sourcing equipments, two powered devices corresponding thereto, and two claddings or the like in an optical fiber for supplying feed light). However, as far as a plurality of power supply systems is provided, the number thereof is not particularly limited.

Further, the power supply target of the powered devices may be a device(s) external to the power over fiber system as far as an electric power amount required thereby is detectable.

Further, in the fifth to seventh embodiments, two power sourcing equipments 110 are provided. However, a plurality of power sourcing equipments outputting a plurality of feed beams of feed light having wavelengths different from one another may be provided.

INDUSTRIAL APPLICABILITY

As described above, an optical power supply system according to the present invention is useful for achieving efficient power supply.

REFERENCE SIGNS LIST

1A Power over Fiber System (Optical Power Supply System)
1 Power over Fiber System (Optical Power Supply System)
1B Power over Fiber System (Optical Power Supply System)
1C Power over Fiber System (Optical Power Supply System)
1D Power over Fiber System (Optical Power Supply System)
1E Power over Fiber System (Optical Power Supply System)
1F Power over Fiber System (Optical Power Supply System)
1G Power over Fiber System (Optical Power Supply System)
100 First Data Communication Device
100C First Data Communication Device
100E First Data Communication Device
110 Power Sourcing Equipment
110a First Power Sourcing Equipment
110b Second Power Sourcing Equipment
110c First Power Sourcing Equipment
110d Second Power Sourcing Equipment
111 Semiconductor Laser for Power Supply
112 Feed Light/Beam
120 Transmitter
125 Signal Light
130 Receiver
140 Light Input/Output Part
141 Optical Connector
150 Power Supply Controller
151 Power Supply Controller 200A Optical Fiber Cable
200 Optical Fiber Cable
200B Optical Fiber Cable
200C Optical Fiber Cable
200D Optical Fiber Cable
200E Optical Fiber Cable
200G Optical Fiber Cable
210 Core
220 Cladding
221 First Cladding
222 Second Cladding
223 First Cladding
224 Second Cladding
250A Optical Fiber
250 Optical Fiber
250C Optical Fiber
250D Optical Fiber
250E Optical Fiber
250G Optical Fiber
260 Optical Fiber
270 Optical Fiber
300 Second Data Communication Device
300C Second Data Communication Device
300E Second Data Communication Device
310 Powered Device
310E Powered Device
310a First Powered Device
310b Second Powered Device
310c First Powered Device
310d Second Powered Device
311 Photoelectric Conversion Element
320 Transmitter
325 Signal Light
330 Receiver
350 Light Input/Output Part
351 Optical Connector
360 Electric Power Detector (Detector)
361 Electric Power Detector (Detector)
370 Power Supply Target

The invention claimed is:

1. An optical power supply system, comprising:
a plurality of power sourcing equipments each outputting feed light;
a plurality of powered devices provided so as to correspond to the plurality of power sourcing equipments and each converting the feed light output from their corresponding power sourcing equipments into electric power;
a detector that detects an electric power amount required by a power supply target of the powered devices; and
a power supply controller that controls, based on the required electric power amount detected by the detector, output of the feed light from each of the power sourcing equipments, wherein the power supply controller controls the output of the feed light from each of the power sourcing equipments such that a total power supply amount from the power sourcing equipments to the powered devices satisfies the required electric power amount and also a net power supply efficiency is equal to or greater than a predetermined value.

2. The optical power supply system according to claim 1, wherein the power supply efficiency includes at least one of an output efficiency of the power sourcing equipments according to the output and a transmission efficiency of an optical fiber that transmits the feed light from the power sourcing equipments to the powered devices.

3. The optical power supply system according to claim 1, wherein the power sourcing equipments are prioritized for use in advance, and
wherein the power supply controller causes the power sourcing equipments to successively output the feed light in descending order of the priority according to the required electric power amount.

4. The optical power supply system according to claim 1, comprising:
a first data communication device including the power sourcing equipments;
a second data communication device including the powered devices and performing optical communication with the first data communication device by signal light; and
an optical fiber that transmits the feed light and the signal light between the first data communication device and the second data communication device.

5. The optical power supply system according to claim 4, wherein the power supply controller is provided in the first data communication device, and
wherein the detector is provided in the second data communication device and transmits information on the detected required electric power amount to the first data communication device by the signal light.

6. An optical power supply system, comprising:
a plurality of power sourcing equipments outputting a plurality of feed beams of feed light having wavelengths different from one another;
a powered device that converts the feed light output from the power sourcing equipments into electric power;
a detector that detects electric power amounts of the electric power into which the powered device has converted the feed beams of the feed light; and
a power supply controller that controls, based on the electric power amounts detected by the detector, output of each of the feed beams from the power sourcing equipments,
wherein the detector detects the electric power amounts that are obtained by the powered device when the power sourcing equipments output the feed beams of same electric power, and
wherein the power supply controller causes, of the power sourcing equipments, one power souring equipment outputting the feed beam by which the electric power amount detected by the detector is largest to supply power to the powered device.

7. The optical power supply system according to claim 6, wherein the powered device includes:
a photoelectric conversion element that converts the feed light into the electric power; and
a plurality of wavelength converters that convert wavelengths of the feed beams of the feed light into wavelengths capable of being photoelectrically converted by the photoelectric conversion element, and
wherein, of the feed beams, only a feed beam the wavelength of which has been converted by one of the wavelength converters is input to the photoelectric conversion element.

8. The optical power supply system according to claim 6, comprising an optical branching device to which the feed beams from the power sourcing equipments are input and to which the powered device including a plurality of powered devices is connectable, and
wherein, for each of the powered devices, the power supply controller controls, based on the electric power amounts detected by the detector, the output of each of the feed beams from the power sourcing equipments.

9. The optical power supply system according to claim 6, comprising:
- a first data communication device including the power sourcing equipments;
- a second data communication device including the powered device and performing optical communication with the first data communication device by signal light; and
- an optical fiber that transmits the feed light and the signal light between the first data communication device and the second data communication device.

10. The optical power supply system according to claim 9,
- wherein the power supply controller is provided in the first data communication device, and
- wherein the detector is provided in the second data communication device and transmits information on the detected electric power amounts to the first data communication device by the signal light.

* * * * *